(12) United States Patent
Karras et al.

(10) Patent No.: US 8,444,128 B2
(45) Date of Patent: May 21, 2013

(54) DOUBLE ACTING WORK SUPPORT WITH INTERNAL SEQUENCE CONTROL

(75) Inventors: Nick J. Karras, Macomb, MI (US); Aaron Luthi, Madison, KS (US)

(73) Assignee: Vektek, Inc., Emporia, KS (US)

( * ) Notice: Subject to any disclaimer, the term of this patent is extended or adjusted under 35 U.S.C. 154(b) by 888 days.

(21) Appl. No.: 12/554,418

(22) Filed: Sep. 4, 2009

(65) Prior Publication Data

US 2010/0052233 A1 Mar. 4, 2010

Related U.S. Application Data

(60) Provisional application No. 61/094,291, filed on Sep. 4, 2008.

(51) Int. Cl.
*B23Q 5/06* (2006.01)
*B23Q 7/06* (2006.01)

(52) U.S. Cl.
USPC ............ 269/24; 269/30; 269/32; 269/35

(58) Field of Classification Search
USPC ............ 52/24, 30, 32, 35; 188/67; 269/24, 269/30, 32, 35, 310, 309
See application file for complete search history.

(56) References Cited

U.S. PATENT DOCUMENTS

| | | | | |
|---|---|---|---|---|
| 1,051,000 A * | 1/1913 | Peerstone | ...................... | 303/39 |
| 2,466,129 A * | 4/1949 | Stoner | ............................ | 279/48 |
| 2,568,092 A * | 9/1951 | Sloan et al. | .................... | 285/101 |
| 3,605,569 A * | 9/1971 | sessody | ............................ | 92/33 |
| 4,116,113 A * | 9/1978 | Leclerc | ............................ | 92/24 |
| 4,305,565 A * | 12/1981 | Abbe | ............................. | 251/1.3 |
| 4,560,152 A * | 12/1985 | Miller | ............................ | 269/24 |
| 4,619,188 A * | 10/1986 | Kimura | ............................ | 92/26 |
| 4,679,811 A * | 7/1987 | Shuler | ........................... | 280/284 |
| RE32,885 E * | 3/1989 | Graham | ....................... | 303/9.76 |
| 5,108,079 A * | 4/1992 | Yonezawa et al. | .............. | 269/24 |

(Continued)

FOREIGN PATENT DOCUMENTS

FR 2578180 A1 * 9/1986
JP 55120434 A * 9/1980

OTHER PUBLICATIONS

"Roemheld B 1.930 Work Support, Self-Locking," Römheld GmbH Catalog, Issue 7-03 E (2 pages).

(Continued)

*Primary Examiner* — Phi A
(74) *Attorney, Agent, or Firm* — Hovey Williams LLP (57) ABSTRACT

A work support comprises a plunger, a transmission member, a first chamber, a second chamber, a third chamber, a clamping mechanism, a plug, and a body. The plunger may be slidably retained within the clamping mechanism, which in turn is firmly held within the transmission member. The transmission member may extend and retract from the body corresponding to a pressure in the first chamber and the second chamber. Extension of the transmission member also extends the plunger such that the plunger may contact and receive a load from a work piece. The third chamber may be located between the outer surface of the clamping mechanism and the inner surface of the transmission member. Increasing pressure in the first chamber while decreasing pressure in the second chamber extends the transmission member and opens the plug which blocks the entry to the third chamber. Pressure in the third chamber closes the gap between the clamping mechanism and the plunger and applies a clamping force to the plunger.

26 Claims, 8 Drawing Sheets

U.S. PATENT DOCUMENTS

| | | | | |
|---|---|---|---|---|
| 5,235,896 A * | 8/1993 | Huber | | 91/44 |
| 5,558,408 A * | 9/1996 | Naedler et al. | | 303/7 |
| 5,876,025 A * | 3/1999 | Yonezawa | | 269/24 |
| 5,887,862 A * | 3/1999 | Yonezawa | | 269/310 |
| 5,957,443 A * | 9/1999 | Mascola | | 269/22 |
| 6,059,277 A * | 5/2000 | Sawdon et al. | | 269/24 |
| 6,691,994 B2 * | 2/2004 | Kawakami | | 269/309 |
| 8,132,798 B2 * | 3/2012 | McIntosh et al. | | 269/32 |
| 8,132,801 B2 * | 3/2012 | Miyashita et al. | | 269/49 |
| 8,176,616 B2 * | 5/2012 | Stevenson et al. | | 29/559 |
| 2003/0098539 A1 * | 5/2003 | Kawakami | | 269/309 |

OTHER PUBLICATIONS

"Roemheld B 1.911 Work Supports," Römheld GmbH Catalog, Issue 3-04 E (2 pages).

* cited by examiner

DOUBLE ACTING WORK SUPPORT WITH INTERNAL SEQUENCE CONTROL

RELATED APPLICATIONS

This nonprovisional patent application claims priority benefit, with regard to all common subject matter, of earlier-filed U.S. provisional patent application titled "DOUBLE ACTING WORK SUPPORT WITH INTERNAL SEQUENCE CONTROL", Ser. No. 61/094,291, filed Sep. 4, 2008. The identified earlier-filed application is hereby incorporated by reference in its entirety into the present application.

BACKGROUND OF THE INVENTION

1. Field of the Invention

Embodiments of the present invention relate to work supports. More particularly, embodiments of the present invention relate to double acting fluid advanced work supports with sequenced clamping and unclamping processes.

2. Description of the Related Art

Work supports typically utilize a pressurized medium, such as hydraulic fluid, to diametrically activate a clamping mechanism which holds a plunger in a fixed position in order to provide support for a work piece while the work piece is being processed in an assembly or manufacturing environment. Double acting work supports also use the pressurized fluid to extend the plunger to the work piece and retract the plunger from the work piece. Often, the same flowable medium pathway or circuit is utilized to extend and clamp the plunger as well as retract and unclamp the plunger. Since the plunger is being extended toward the work piece at the same time as the pressurized fluid is contracting the clamping mechanism, it is possible that the clamping mechanism may clamp the plunger in a fixed position before the plunger has extended to the work piece. As a result, the work piece may not have proper support while it is being processed.

Work supports also often include a piston and a spring within the plunger to assist the plunger in extending to the work piece before the clamping mechanism is fully contracted and locks the plunger in a fixed position. Usually, the spring and the piston are positioned such that pressurized fluid will fully advance the piston while compressing the spring to control contact force when the plunger contacts the work piece. When it is time to retract and unclamp the work support, the pressurized fluid is evacuated from the clamping mechanism at the same time as the piston is being retracted. It is possible that the clamping mechanism unlocks the plunger before the piston has retracted sufficiently. When the clamping mechanism unlocks the plunger, the internal spring can uncompress and extend the plunger. If the piston has not retracted a sufficient distance, the plunger may extend upward with a small force before retracting which may contact and move or dislodge an unclamped work piece, which in turn may cause work piece ejection or location problems for automated equipment handling the work piece.

SUMMARY OF THE INVENTION

Embodiments of the present invention solve the above-mentioned problems and provide a distinct advance in the art of double acting work supports. More particularly, embodiments of the invention provide a double acting work support that delays the clamping process until the work support is fully extended with the plunger in contact with the work piece and delays the unclamping process until the work support is fully retracted with the plunger removed from the work piece.

In various embodiments of the current invention, the work support comprises a plunger, a transmission member, a first chamber, a second chamber, a third chamber, a clamping mechanism, a plug, and a body. The plunger may be slidably retained within the clamping mechanism, which in turn is firmly held within the transmission member. The transmission member is positioned within the body and separates the first chamber and the second chamber. The transmission member may extend and retract from the body corresponding to a pressure in the first chamber and second chamber, wherein a pressurized flowable medium may be received that supplies the pressure. Extension of the transmission member also extends the plunger such that the plunger may contact and receive a load from a work piece.

The third chamber may be located between the outer surface of the clamping mechanism and the inner surface of the transmission member. The pressurized flowable medium may flow between the first chamber and the third chamber once the plug, which blocks the path from the first chamber to the third chamber, is opened.

The work support may extend and clamp the plunger to support the work piece. And, after work on the work piece is performed, the work support may retract and unclamp the plunger. The extend and clamp process may include receiving the pressurized flowable medium to fill the first chamber, which also pressurizes the first chamber. Increasing flow and pressure in the first chamber forces the transmission member and the plunger to extend from the body of the work support. As the transmission member and the plunger extend, the plunger may encounter and contact the work piece. When the transmission member is fully extended, increasing pressure within the first chamber applies a force to the plug, which blocks the path from the first chamber to the third chamber. When the pressure in the first chamber is great enough to open the plug, the pressurized flowable medium flows from the first chamber to the third chamber, wherein pressure is applied to the outer surface of the clamping mechanism. Pressure on the clamping mechanism contracts the diameter of the mechanism, such that the gap between the clamping mechanism and the plunger is closed. A further increase in pressure on the clamping mechanism applies a clamping force to the plunger, rigidly holding the plunger in place to receive the load from the work piece. When the pressure in the third chamber reaches an equilibrium with the pressure in the first chamber, the plug closes and maintains pressure within the third chamber.

The retract and unclamp process may include evacuating the pressurized flowable medium from the first chamber of the work support and receiving the pressurized flowable medium to fill the second chamber, thereby reducing the pressure in the first chamber and increasing pressure in the second chamber. The differential in pressure allows the transmission member and the plunger to retract away from the work piece and into the body of the work support. As the transmission member and the plunger fully retract, a pusher, internal to the body of the work support, opens the plug that blocks the path from the third chamber to the first chamber. With the plug opened, the pressurized flowable medium flows from the third chamber to the first chamber, thus reducing the pressure on the clamping mechanism which also reduces the clamping force on the plunger. At a certain level of reduced pressure, the clamping force on the plunger is removed. A further reduction in pressure, allows the clamping mechanism to diametrically expand and creates a clearance between the clamping mechanism and the plunger.

This summary is provided to introduce a selection of concepts in a simplified form that are further described below in the detailed description. This summary is not intended to identify key features or essential features of the claimed subject matter, nor is it intended to be used to limit the scope of the claimed subject matter.

Other aspects and advantages of the present invention will be apparent from the following detailed description of the embodiments and the accompanying drawing figures.

BRIEF DESCRIPTION OF THE DRAWING FIGURES

Embodiments of the present invention is described in detail below with reference to the attached drawing figures, wherein.

The drawing figures do not limit the present invention to the specific embodiments disclosed and described herein. The drawings are not necessarily to scale, emphasis instead being placed upon clearly illustrating the principles of the invention.

DETAILED DESCRIPTION OF THE EMBODIMENTS

The following detailed description of the invention references the accompanying drawings that illustrate specific embodiments in which the invention can be practiced. The embodiments are intended to describe aspects of the invention in sufficient detail to enable those skilled in the art to practice the invention. Other embodiments can be utilized and changes can be made without departing from the scope of the present invention. The following detailed description is, therefore, not to be taken in a limiting sense. The scope of the present invention is defined only by the appended claims, along with the full scope of equivalents to which such claims are entitled.

A double acting work support 10 with a delayed clamping and release sequence, constructed in accordance with various embodiments of the present invention, is shown in FIGS. 1-14. The work support 10 broadly comprises a plunger 12, a clamping sleeve 14, a transmission member 16, a body 18, a retainer 20, a cap 22, a clamping sleeve pressure chamber 24, an extend chamber 26, a pusher 28, a poppet 30, a first port 32, and a second port 34. Also shown in FIGS. 6-14 is a work piece W that provides the load which the work support 10 will support.

The plunger 12 generally receives the load from the work piece W. The plunger 12 may be cylindrical or rod shaped with a uniform outer diameter along the longitudinal axis of the plunger 12. The plunger 12 is typically manufactured from metal, such as stainless steel. The outer surface of the plunger 12 is generally smooth. Threadably coupled to one end of the plunger 12 may be a contact bolt 36, which contacts the work piece W. The lower end of the contact bolt 36 may also provide a fixed contact point for a first spring 38 that is housed within a plunger spring chamber 40. The other end of the first spring 38 may contact a washer 41, which is secured by a screw 42 that is threadably coupled to the upper end of an elongate cylindrical stud 44. The plunger 12 may include a hollow internal recess 46 in the lower portion of the plunger 12 such that the inner diameter of the plunger internal recess 46 is slightly larger than the outer diameter of the stud 44. With this relationship, the plunger 12 may slide over the stud 44. However, unless in contact with work piece W, the first spring 38 generally forces the plunger 12 into a position at its upper end of travel with respect to the stud 44. The lower end of the stud 44 may be threadably coupled with the retainer 20.

The clamping sleeve 14 generally provides the clamping mechanism to firmly hold the plunger 12 in a fixed position. The clamping sleeve 14 may be cylindrical in shape with a hollow interior and an inner diameter which is slightly larger than the outer diameter of the plunger 12, such that the plunger 12 is received within the inner diameter of the clamping sleeve 14 and the plunger 12 is free to slide within the clamping sleeve 14 when the clamping sleeve 14 is relaxed. When pressure is applied to the outer surface of the clamping sleeve 14, the circumference of the clamping sleeve 14 may compress such that the inner diameter of the clamping sleeve 14 decreases and the inner surface of the clamping sleeve 14 contacts the outer surface of the plunger 12. As the pressure on the exterior of the clamping sleeve 14 increases, the clamping sleeve 14 applies a clamping force to the plunger 12 to hold the plunger 12 in a fixed position.

Various embodiments of the work support 10 may include the clamping sleeve 14 as disclosed in "CLAMPING SLEEVE", application Ser. No. 12/554,367, filed Sep. 4, 2009, which is hereby incorporated by reference, in its entirety. In these embodiments, the clamping sleeve 14 may include one or more corrugations 48 that provide a point of flexure when surface-normal, radially inward forces are applied to the outer surface of the clamping sleeve 14. Thus, the edges of each corrugation 48 may flex or pivot slightly about the center of the corrugation 48 when external pressure is applied to the outer surface of the clamping sleeve 14. As a result, the circumference of the inner surface of the clamping sleeve 14 may contract slightly, such that the effective inner diameter of the clamping sleeve 14 decreases and the inner surface of the clamping sleeve 14 contacts the outer surface of the plunger 12. In various embodiments, the clamping sleeve 14 may be utilized as the clamping mechanism of the work support 10. However, in general, other styles or types of clamping mechanisms, such as clamping collets and the like, may be utilized without departing from the scope of the current invention.

The transmission member 16 may be roughly cylindrical in shape with a hollow interior. The clamping sleeve 14 may be received within the inner diameter of the transmission member 16 in a fixed position. The clamping sleeve 14 may include a lower shoulder 50 on the outer circumference of its lower edge that is pressed into the transmission member 16 and uses the retainer 20 to position and hold the clamping sleeve 14 in place. There may also be a resilient first O-ring 52 located at the upper end of the retainer 20 and the lower end of the clamping sleeve 14 to form a seal therebetween. The clamping sleeve 14 may also include an upper shoulder 54 on the outer circumference of its upper edge, which along with a resilient second O-ring 56, forms a seal along the inner surface of the transmission member 16 and the outer surface of the upper shoulder 54 on clamping sleeve 14. Positioned between the upper shoulder 54 and the lower shoulder 50 of the clamping sleeve 14 may be a tubular sidewall 58 with a smaller outer diameter than the upper shoulder 54 and the lower shoulder 50. The clamping sleeve pressure chamber 24 may be formed in the volume between the upper shoulder 54 and the lower shoulder 50 of the clamping sleeve 14 and the gap between the tubular sidewall 58 and the inner surface of the transmission member 16. Furthermore, the clamping sleeve 14 may also include a narrow, longitudinal slot 60 on the outer surface of the lower portion of the sleeve 14 that provides passage to the clamping sleeve pressure chamber 24.

The transmission member 16 may be received within a central bore 62 in the body 18. The transmission member 16 is generally telescopically slidable within the body 18, along the central axis of the body 18. The transmission member 16 may include an outwardly extending central band 64 with a shoulder 66 at its upper edge. The body 18 may include an inwardly extending ring 68 along the length of the central bore 62. As the transmission member 16 slides within the central bore 62 of the body 18, the shoulder 66 of the central band 64 may encounter the lower edge of the ring 68 within the body 18, thus preventing further travel in the upward direction. At the upper end of the transmission member 16 may be a preload gland 70 that is threadably coupled to the inner surface of the transmission member 16 and may be positioned just above the upper end of the clamping sleeve 14. The preload gland 70 may surround the outer diameter of the plunger 12. The lower end of the preload gland 70 may contact the upper end of the clamping sleeve 14 to ensure the lower end of the clamping sleeve 14 is held against the upper end of the retainer 20. In addition, there may be a wiper 72 within the inner diameter of the transmission member 16 located above the preload gland 70 and also contacting the outer surface of the plunger 12 in order to prevent debris or other objects from entering the work support 10.

The retainer 20 has a generally cylindrical outer surface with an outwardly extending ring 74 at the lower edge of the retainer 20. The retainer 20 may include threads on the upper portion of the outer surface that couple with threads in the inner surface of the lower portion of the transmission member 16 and the upper edge of the outer ring 74 may contact the lower edge of the transmission member 16. Furthermore, there may be a resilient third O-ring 76 located just below the threads of the retainer 20 to form a seal between the retainer 20 and the transmission member 16. The retainer 20 may also include an inner cavity 78 of cylindrical shape with a tapered bottom end and a circular opening 84 in the center. Threads located on the upper portion of the inner cavity 78 sidewall may couple with the lower end of the stud 44. There may also be a resilient fourth O-ring 79 located just above the threads of the stud 44 to form a seal between the retainer 20 and the stud 44. The stud 44 may include a spring chamber 80 which houses a resilient member second spring 82. Attached to the end of the second spring 82 that extends from the chamber 80 is an annular shaped washer 86. The poppet 30 may be positioned in contact with the central opening of the washer 86. The second spring 82 may be generally under compression when it is inserted into the spring chamber 80 such that the washer 86 attached to the second spring 82 pushes the poppet 30 against the tapered bottom of the inner cavity 78 of the retainer 20. The shape of the poppet 30 may be generally rounded (e.g., spherical, elliptical, oval, etc.) however, other shapes are possible such as a circular cone. The second spring 82 in combination with the washer 86 and the poppet 30 form a force-controlled plug 88 for the opening 84 of the retainer 20.

The retainer 20 may also include a passageway 90 that extends from the inner cavity 78 radially outward and upward to the outer surface of the retainer 20, where it generally aligns with the slot 60 of the clamping sleeve 14. Thus, a path is established from the inner cavity 78 of the retainer 20 through the passageway 90 and the slot 60 to access the clamping sleeve pressure chamber 24.

The cap 22 is generally cylindrical disk shaped with threads on the upper portion of the outer wall that couple with threads on the lower portion of the inner surface of the body 18. The cap 22 may also include an outwardly extending ring 92 on the lower portion of its outer wall such that the outer diameter of the ring 92 of the cap 22 is greater than the inner diameter of the body 18 where the cap 22 and the body 18 are coupled together. Furthermore, there may be a resilient fifth O-ring 94 positioned between the lower edge of the body 18 and the cap 22 to form a seal.

The cap 22 may also include an upper surface recess 96 in which the pusher 28 is located such that the pusher 28 is axially aligned and extending upward from the cap 22. The pusher 28 is also aligned with the opening 84 in the bottom of the retainer 20 such that when the transmission member 16 is positioned near its lowest point of travel, the pusher 28 is in contact with the poppet 30. The pusher 28 is generally a protrusion from the cap 22 that is operable to push or separate a poppet 30 from a seat formed from the bottom of the cavity 78. Furthermore, the retainer 20 may also include a slotted passageway 97 that is located on the bottom surface of the retainer 20 and starts at the diametrical protrusion of the bottom surface and extends outward. Thus, a path is established from the recess 96 to the extend chamber 26 when the bottom surface of the retainer 20 contacts the upper surface of the cap 22.

The volume for the extend chamber 26 may be defined by the upper surface of the cap 22 to the lower edge of the inner ring 68 and between the transmission member 16 with the retainer 20 and the central bore 62 of the body 18. The extend chamber 26 may also be divided into an upper extend chamber 98 and a lower extend chamber 100. The boundary between the upper extend chamber 98 and the lower extend chamber 100 may be established by an extend chamber seal 102, which may be located in a recess 104 positioned near the middle of the transmission member central band 64. Thus, the upper extend chamber 98 may include the space from the lower edge of the inner ring 68 to the extend chamber seal 102 and between the center bore 62 and the transmission member 16, and the lower extend chamber 100 may include the space from the extend chamber seal 102 to the upper surface of the cap 22 and between the center bore 62 and the transmission member 16 with the retainer 20. During the operation of the work support 10, the transmission member 16 may travel in the extend chamber 26 from its lowest point, where the bottom surface of the retainer 20 contacts the upper surface of the cap 22, to its highest point, where the shoulder 66 of the transmission member 16 contacts the lower edge of the inner ring 68 of the body 18.

A ring-shaped wiper 108 may be retained in a recess that is positioned within the inner ring 68 near the top of the body 18. The wiper 108 may contact the outer surface of the transmission member 16 as the transmission member 16 slides telescopically within the body 18 during the operation of the work support 10. The wiper 108 may prevent debris or other objects from entering the work support 10 when the transmission member 16 retracts into the work support 10.

Figures 1, 2, 3:
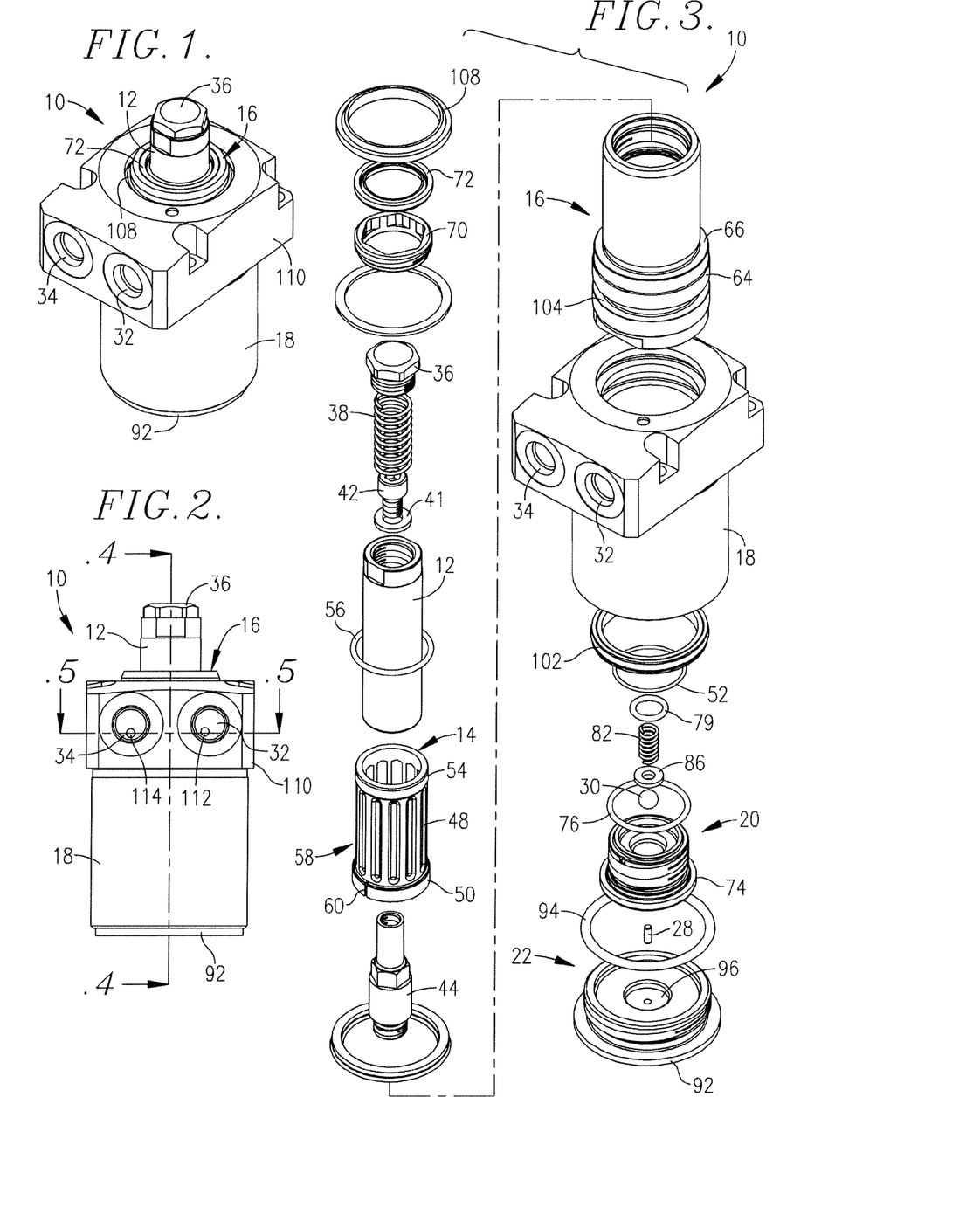
FIG. 1 is an overhead perspective view looking down at a double acting work support, constructed in accordance with various embodiments of the present invention.
FIG. 2 is a front elevational view of the work support with a view of a first port and a second port.
FIG. 3 is an exploded view of the work support from an overhead perspective.
Figures 4, 5:
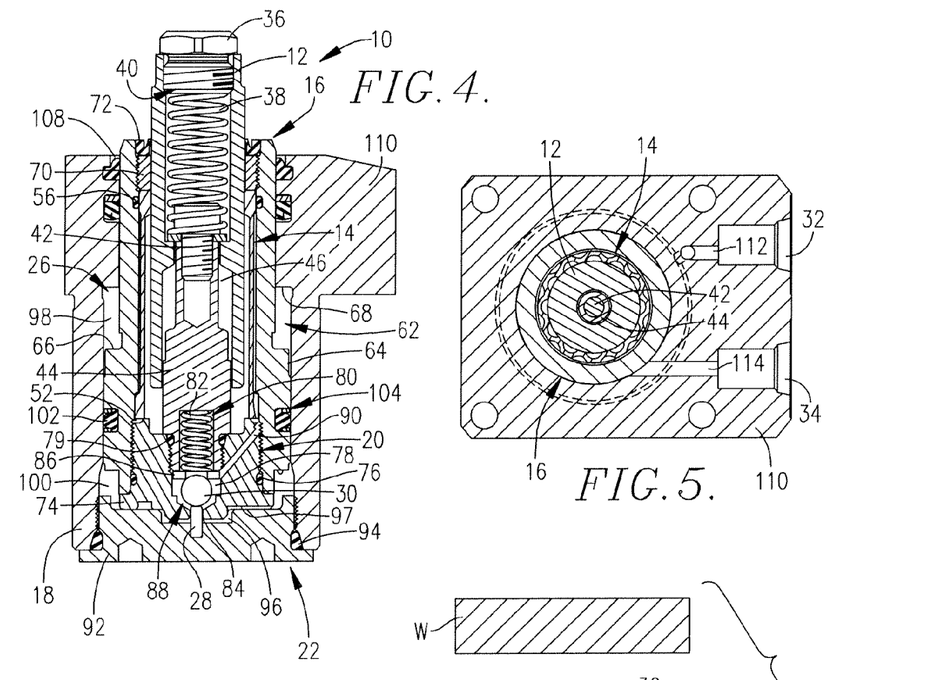
FIG. 4 is a sectional view of the work support cut along a vertical plane (4-4 of FIG. 2) through the central longitudinal axis.
FIG. 5 is a sectional view of the work support cut along a horizontal plane (5-5 of FIG. 2) through the first port and the second port, looking downward.

The body 18 may have a generally cylindrical external shape along its longitudinal axis. Positioned in the upper region of the body 18 may be a port housing 110 of generally rectangular box shape that may be integrally formed with the upper portion of the body 18, as seen in FIG. 5. The port housing 110 may contain the first port 32 and the second port 34, which are accessible on the front face of the port housing 110. The first port 32 may be coupled to a first port passageway 112 which travels horizontally through the port housing 110 and then vertically through the body 18 where it opens into the lower extend chamber 100, as seen in FIGS. 6-14. The second port 34 may couple with a second port passageway 114 that extends horizontally to intersect the inner ring 68 of the body 18. Between the inner ring 68 and the transmission member 16 there may be a very small gap which allows a flowable medium to flow from the second port passageway 114 to the upper extend chamber 98.

Figure 12:
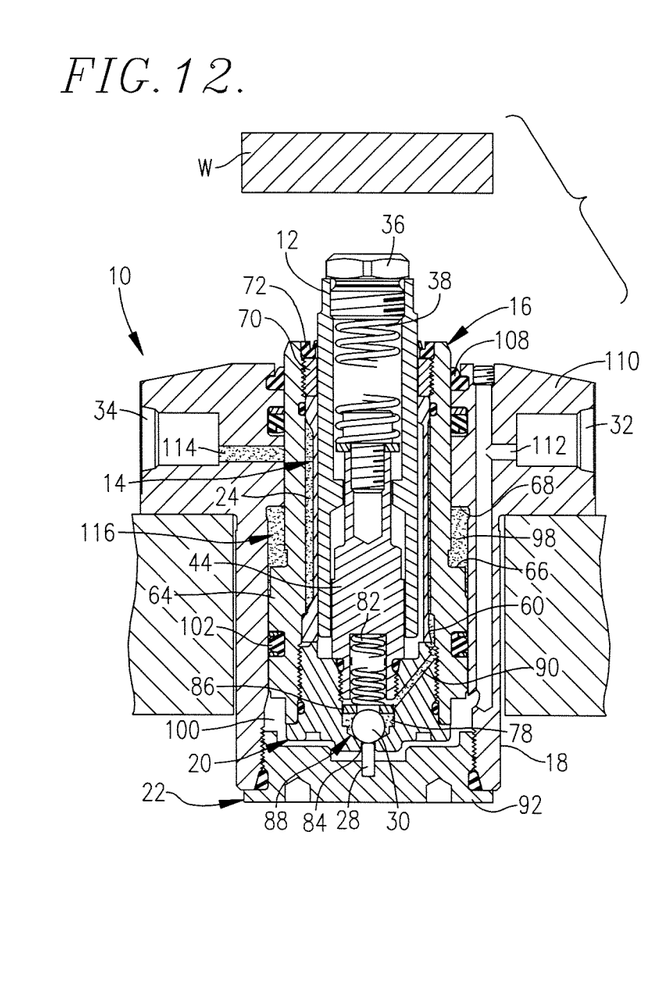
FIG. 12 shows a similar view as described for FIG. 6, demonstrating a first sequence of a retract and unclamp operation.
Figure 13:
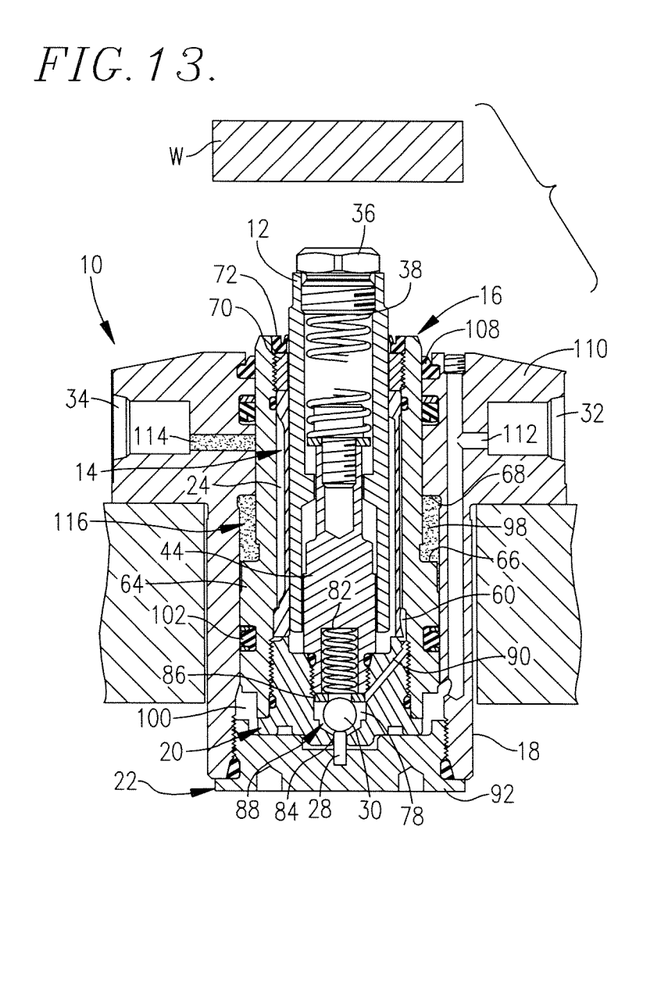
FIG. 13 shows a similar view as described for FIG. 6, demonstrating a second sequence of the retract and unclamp operation.
Figure 14:
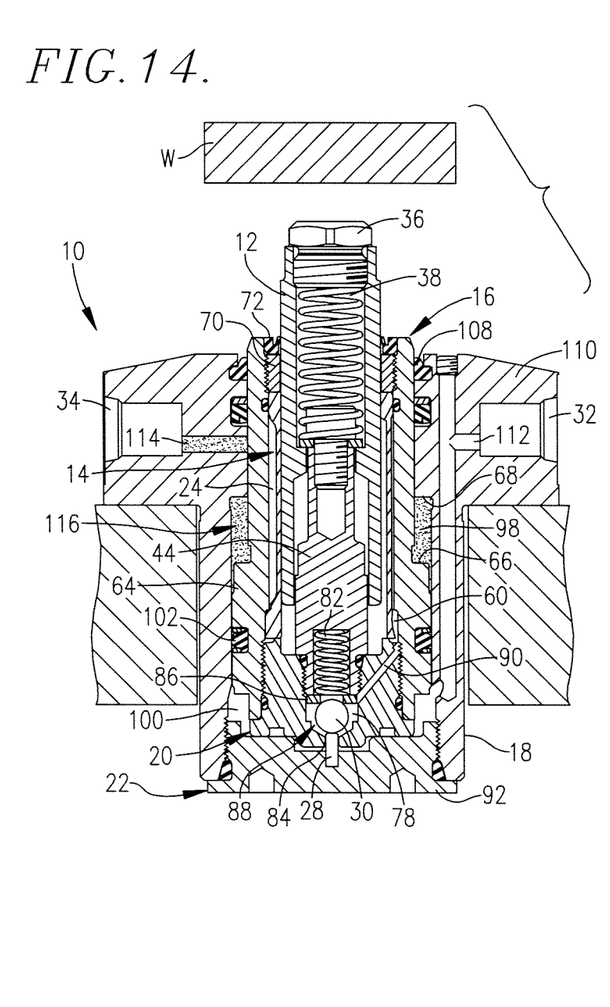
FIG. 14 shows a similar view as described for FIG. 6, demonstrating a third sequence of the retract and unclamp operation.

The work support may operate as follows. The work support generally performs two operations—an extend and clamp operation and a retract and unclamp operation. The extend and clamp operation is illustrated in FIGS. 6-11, while the retract and unclamp operation is shown in FIGS. 12-14. As noted in the "Brief Description of the Drawing Figures", FIGS. 6-14 show a sectional view of the work support 10 taken along a vertical plane through the central longitudinal axis of the body 18, wherein the figures are modified to show the first port 32 with the first port passageway 112 on the right side of the work support 10 and the second port 34 with the second port passageway 114 on the left side of the work support 10. This modification serves to better illustrate the two operations.

Figure 6:
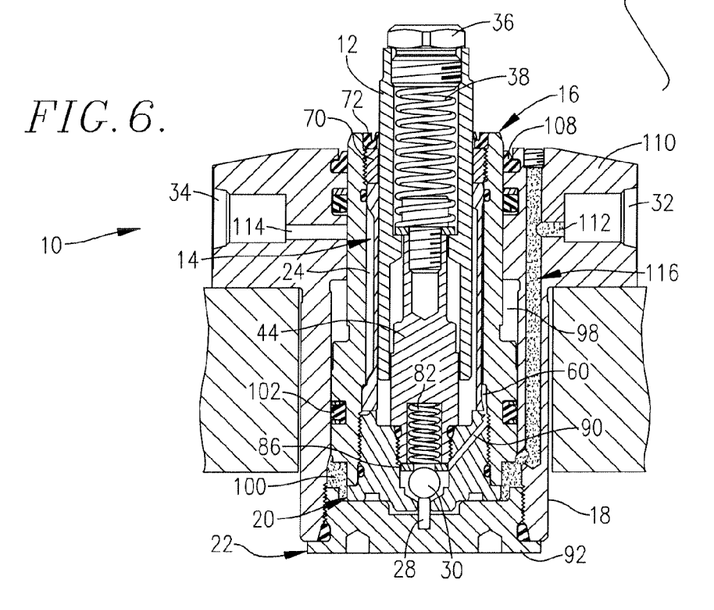
FIG. 6 is a sectional view of the work support, cut along a vertical plane through the central longitudinal axis, with a work piece, wherein the sectional view of the work support is modified to show both the first port and the second port, which are positioned at opposing ends of the work support in order to demonstrate a first sequence of an extend and clamp operation.

The extend and clamp operation begins with the extend process to properly position the plunger 12 and is followed by the clamping process to lock the plunger 12 in place. Referring to FIG. 6, the work support 10 is in a rest or unenergized state. The transmission member 16 is at its lowest position, wherein the bottom of the retainer 20 is in contact with the upper surface of the cap 22 such that the pusher 28 is in contact with the poppet 30, pushing the poppet 30 and the washer 86 into an up position. Furthermore, the plunger 12 is extended, due to the force of the first spring 38, and at its uppermost position with respect to the clamping sleeve 14 and the transmission member 16.

The extend process is initiated by supplying a pressurized flowable medium 116 to the first port 32, while the second port is opened and any flowable mediums 116 present in the second port 34 is allowed to flow to a tank or reservoir that is external to the work support 10. The pressurized flowable medium 116 may include flowable fluids, such as hydraulic fluid, or liquids, such as water, or other pressure mediums, such as compressed air or other gases, to execute the pressure-related functions of the work support 10. The flowable medium 116 travels through the first port passageway 112 to the lower extend chamber 100, and the flowable medium 116 fills the gap between the lower edge of the central band 64 of the transmission member 16 and the upper surface of the cap 22. However, the flowable medium 116 does not enter the upper extend chamber 98, as flowable medium 116 flow between the upper extend chamber 98 and the lower extend chamber 100 is generally prohibited by the extend chamber seal 102.

Figure 7:
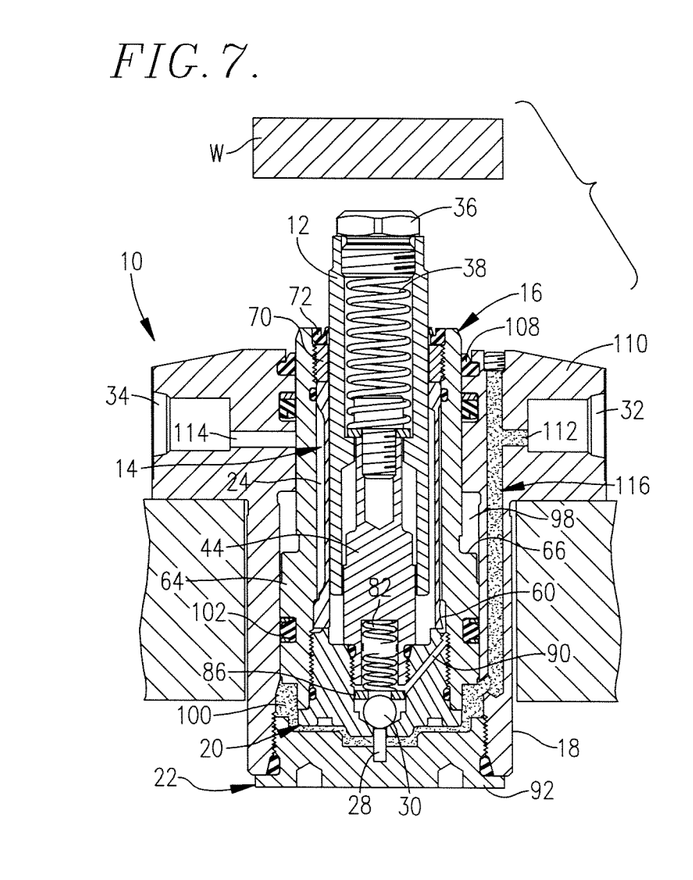
FIG. 7 shows a similar view as described for FIG. 6, demonstrating a second sequence of the extend and clamp operation.

Referring to FIG. 7, the flowable medium 116 continues to fill the lower extend chamber 100. With volume building in the lower extend chamber 100, an upward force is applied to the lower edge of the central band 64 of the transmission member 16. As a result, the transmission member 16 and the retainer 20 start to rise. Thus, space is created between the bottom of the retainer 20 and the top of the cap 22, wherein the flowable medium 116 flows and generates the lifting force on the transmission member 16. As the transmission member 16 travels upward, so does the plunger 12 toward the work piece W. In addition, as the retainer 20 pulls away from the cap 22 and the pusher 28, the second spring 82 coupled to the washer 86 pushes the poppet 30 downward toward the bottom of the cavity 78.

Figure 8:
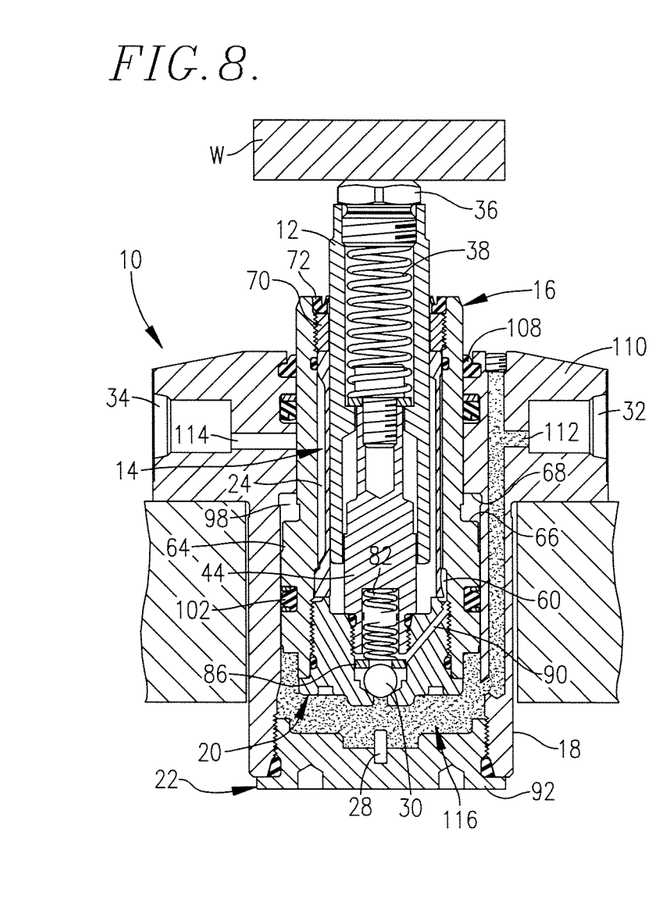
FIG. 8 shows a similar view as described for FIG. 6, demonstrating a third sequence of the extend and clamp operation.

Referring to FIG. 8, increasing volume in the lower extend chamber 100 continues to push the transmission member 16 upward. As the poppet 30 breaks contact with the pusher 28, the second spring 82 and the washer 86 press the poppet 30 firmly against the lower tapered portion of the cavity 78, thus the plug 88 is closed, which blocks off the opening 84 at the bottom of the cavity 78. As a result, the pressurized flowable medium 116 does not enter the cavity 78 through the opening 84 because the pressure of the flowable medium 116 in the lower extend chamber 100 that is pushing upward on the poppet 30 is not great enough to overcome the opposing pressure on the poppet 30 that is created by the force of the second spring 82. As the transmission member 16 rises, so does the plunger 12 until the contact bolt 36 touches the work piece W. Generally, the work support 10 and the work piece W are positioned relative to each other so that the contact bolt 36 may touch the work piece W before the transmission member 16 has reached the end of its upward extension, which is determined by the shoulder 66 of the transmission member 16 contacting the lower edge of the inner ring 68 of the body 18. As can be seen in FIG. 8, the contact bolt 36 is touching the work piece W, but the shoulder 66 of the transmission member 16 is not in contact with the lower edge of the inner ring 68 of the body 18.

Figure 9:
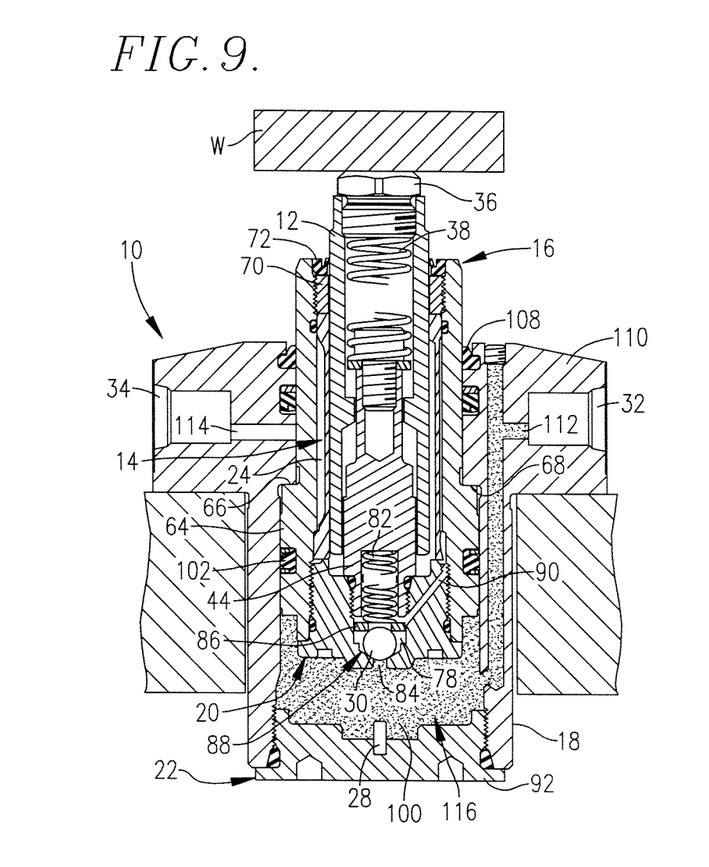
FIG. 9 shows a similar view as described for FIG. 6, demonstrating a fourth sequence of the extend and clamp operation.

Referring to FIG. 9, as the flowable medium 116 continues to fill the lower extend chamber 100, the flowable medium 116 pushes the transmission member 16 to its fully extended position resulting from the shoulder 66 of the transmission member 16 contacting the lower edge of the inner ring 68 of the body 18. While the transmission member 16 has continued to extend upward, the plunger 12 has remained relatively stationary since the contact bolt 36 has encountered the work piece W. Thus, the lower end of the first spring 38 has moved upward, being pushed by the washer 41 which is secured by the screw 42 that is attached to the stud 44, while the upper end of the first spring 38 has not moved, being held roughly in the same position by the work piece W—leaving the first spring 38 in compression.

Figure 10:
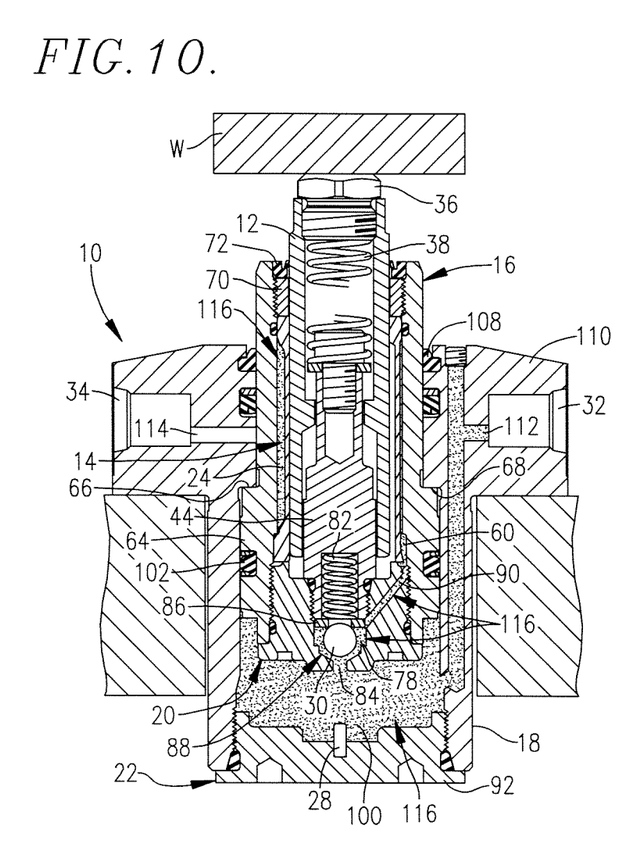
FIG. 10 shows a similar view as described for FIG. 6, demonstrating a fifth sequence of the extend and clamp operation.

Referring to FIG. 10, with the transmission member 16 fully extended and the volume of the lower extend chamber 100 filled by the flowable medium 116, the extension process of the transmission member 16 is complete. As a result, pressure of the flowable medium 116 in the lower extend chamber 100 increases which activates the clamping process. The increasing pressure in the lower extend chamber 100 now applies to the plug 88, which is resting against the bottom of the cavity 78 of the retainer 20 and blocking the flowable medium 116 from passing through the opening 84 and entering the cavity 78. The poppet 30 portion of the plug 88 is held in position by the downward force of the second spring 82, which opposes the upward force on the poppet 30 from the pressurized flowable medium 116. As the pressure in the lower extend chamber 100 increases, the upward force on the poppet 30 exceeds the downward force from the second spring 82 and the poppet 30 is pushed upward from the opening 84 which allows the flowable medium 116 to enter the cavity 78. The flowable medium 116 now has access to the flowable medium passageway 90. The pressurized flowable medium 116 enters the flowable medium passageway 90 and continues through the flowable medium slot 60 in the clamping sleeve 14, such that the flowable medium 116 starts to fill the clamping sleeve pressure chamber 24.

Figure 11:
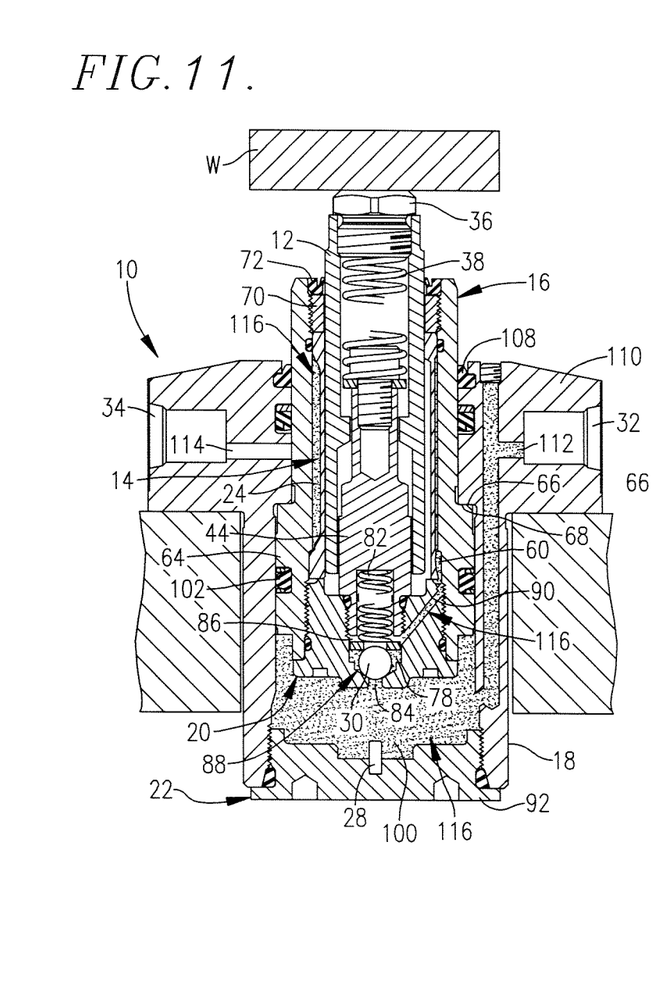
FIG. 11 shows a similar view as described for FIG. 6, demonstrating a sixth sequence of the extend and clamp operation.

Referring to FIG. 11, as flowable medium 116 continues to fill the clamping sleeve pressure chamber 24, pressure on the external surface of the clamping sleeve 14 causes the clamping sleeve 14 to contract circumferentially such that the inner diameter of the clamping sleeve 14 decreases and the clamping sleeve 14 contacts the plunger 12. A further increase in the pressure in the clamping sleeve pressure chamber 24 results in the clamping sleeve 14 applying a clamping force to the plunger 12 firmly holding the plunger 12 in position. As pressure within the clamping sleeve pressure chamber 24 increases, the pressure within the lower extend chamber 100 and the clamping sleeve pressure chamber 24 equalizes. The differential pressure between the lower extend chamber 100 and the cavity 78 approaches a low level, allowing the second spring 82 to seat the poppet 30 which closes the plug 88 and blocks the opening 84. With the plug 88 closed, the flowable medium 116 is prevented from flowing through the opening 84 of the cavity 78, thereby maintaining the pressure of the flowable medium 116 on the clamping sleeve 14 and in turn maintaining the clamping force of the clamping sleeve 14 on the plunger 12. At this point, the extend and clamp operation is complete, and the work piece W may be processed or operated upon.

After the processing, operations, or other work on the work piece W are complete, the retract and unclamp operation begins. Referring to FIG. 12, the retract process begins when the first port 32 is opened allowing the pressurized flowable medium 116 to flow from the lower extend chamber 100 through the first port passageway 112 and out of the first port 32 to an external tank or reservoir. The second port 34 receives the pressurized flowable medium 116 from an external source which flows through the second port passageway 114 and into the upper extend chamber 98. Loss of pressure in the lower extend chamber 100 combined with an increase in pressure in the upper extend chamber 98 causes the transmission member 16 to retract. Although the pressure is falling in the lower extend chamber 100 and the flowable medium 116 is flowing out of the lower extend chamber 100, the plunger 12 is still clamped in the same position, relative to the clamping sleeve 14, as it was at the completion of the extend and clamp operation. The clamping force is still applied to the plunger 12, because the pressurized flowable medium 116 is still present in the clamping sleeve pressure chamber 24 as a result of the exit path for the flowable medium 116 being blocked by the closed plug 88. The clamping force remains effective as the transmission member 16 travels downward until the plug 88 encounters the pusher 28 on the upper surface of the cap 22.

Referring to FIG. 13, as the transmission member 16 lowers, the poppet 30 portion of the plug 88 contacts the pusher 28. Pressure from the flowable medium 116 being present in the upper extend chamber 98 forces the transmission member 16 downward. The pusher 28 pushes upward on the poppet 30, overcoming the downward force from the second spring 82 which in turn unseats the poppet 30 from its position over the opening 84. Consequently, the pressurized flowable medium 116 is allowed to flow out of the clamping sleeve pressure chamber 24 through the slot 60, the flowable medium passageway 90, the cavity 78, the opening 84, the recess 96, the slotted passageway 97, the lower extend chamber 100, the first port passageway 112, and the first port 32, and thus the unclamp process begins. The retract process may continue briefly as the transmission member 16 continues to fall, but the retract process ceases when the retainer 20 contacts the cap 22 and can move no farther.

Referring to FIG. 14, the unclamp process continues as the pressurized flowable medium 116 escapes the clamping sleeve pressure chamber 24. Accordingly, the pressure in the clamping sleeve pressure chamber 24 falls as does the clamping force applied to the plunger 12. At a certain level, the clamping force can no longer overcome the force of the first spring 38 that was compressed during the extend and clamp operation. Therefore, the first spring 38, in an effort to uncompress, forces the plunger 12 upward to its fully extended position. Since, at this point, the transmission member 16 and the plunger 12 are almost fully retracted, when the plunger 12 extends, it does not contact the work piece W and therefore does not disturb the work piece W in any way.

The flowable medium 116 continues to evacuate from the clamping sleeve pressure chamber 24 further reducing the pressure on the clamping sleeve 14 which relaxes and expands slightly which increases the inner diameter of the clamping sleeve 14 and creates clearance between the clamping sleeve 14 and the plunger 12. At this point, the retract and unclamp process is complete.

Figure 15:
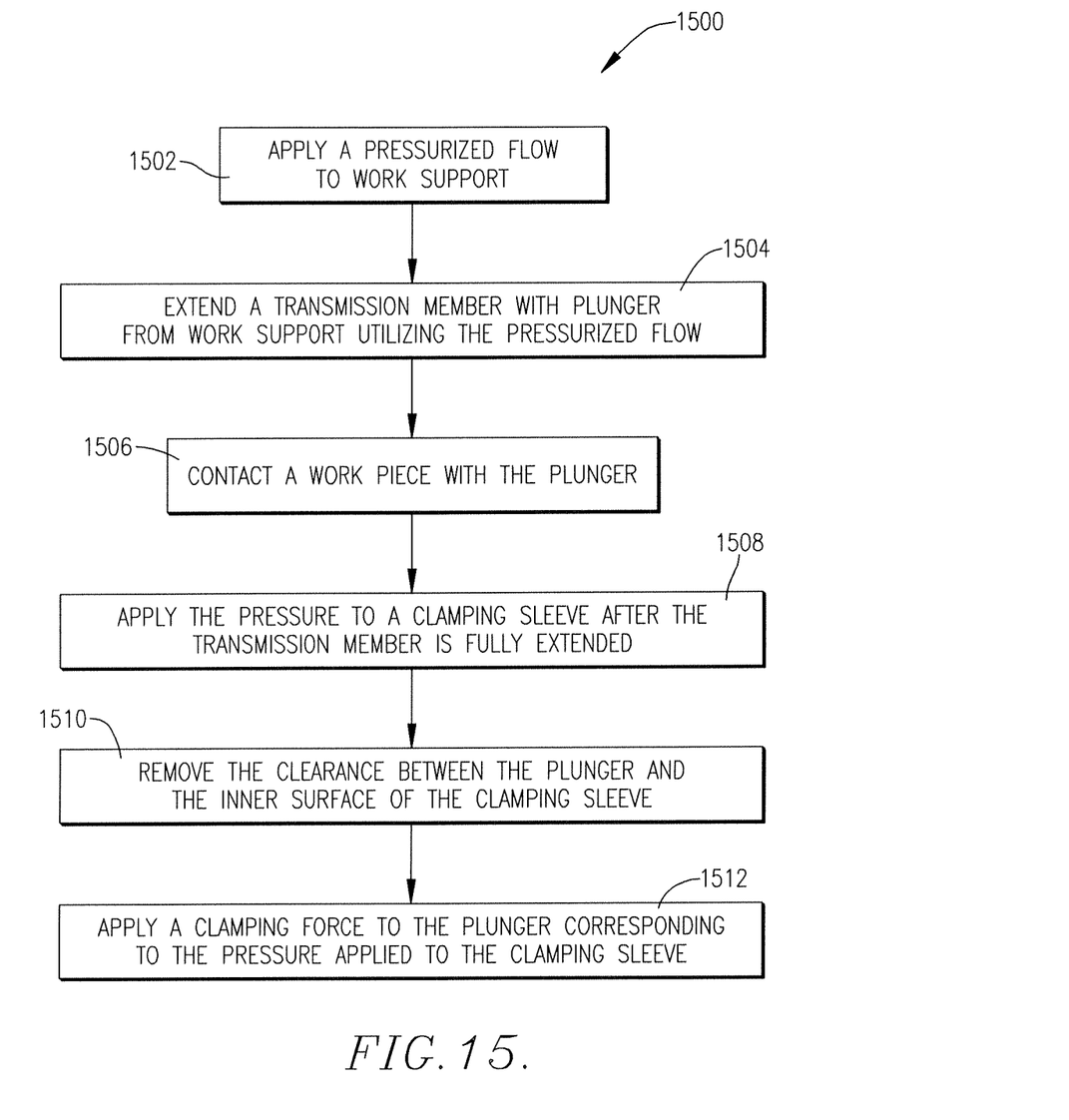
FIG. 15 is a flow diagram depicting some of the steps performed in a method of extending and clamping the work support.

An exemplary method 1500 of extending and clamping a work support 10 is illustrated in FIG. 15. The steps as shown in FIG. 15 do not imply a particular order of execution. Some steps may be performed before, concurrently with, or simultaneously with other steps in contrast to what is shown in the figure.

In step 1502, a pressurized flowable medium 116 is applied and flows to the work support 10 from an external pressure source. The flowable medium 116 may be received by a first port 32 located in a body 18 of the work support 10. The flowable medium 116 may then pass through a first port passageway 112 until it enters a lower extend chamber 100, also located within the body 18, as seen in FIG. 6.

In step 1504, a transmission member 16 with a plunger 12 are extended from the work support 10 by utilizing the flow of the pressurized flowable medium 116. As the pressurized flowable medium 116 fills the lower extend chamber 100, an upward force may be exerted on the lower end of the transmission member 16, which is housed within the body 18, as seen in FIGS. 7-8. The plunger 12 is held within the transmission member 16. The upward force on the transmission member 16 causes both the transmission member 16 and the plunger 12 to rise and extend from the upper portion of the body 18.

In step 1506, a work piece W is contacted by the plunger 12. While the transmission member 16 and the plunger 12 are rising, a contact bolt 36 attached to the upper end of the plunger 12 may encounter the work piece W. Further upward motion of the transmission member 16 causes compression of a first spring 38 located within the plunger 12. Since upward motion of the plunger 12 may be resisted by the work piece W, the first spring 38 continues to compress as the transmission member 16 continues moving upward. As the transmission member 16 extends, pressure in the lower extend chamber 100 increases to overcome the resistance produced by the extend chamber seal 102, the wiper 108, the first spring 38, the wiper 72, and the evacuation of the flowable medium 116 from the upper extend chamber 98.

In step 1508, the pressure is applied to a clamping sleeve 14 after the transmission member 16 is extended. As the flow in the lower extend chamber 100 continues, the transmission member 16 rises to its peak. As a shoulder 66 of the transmission member 16 contacts the lower portion of an inner ring 68 of the body 18, the pressure in the lower extend chamber 100 increases until equilibrium with the external pressure source is reached, as seen in FIG. 9. Furthermore, the pressurized flowable medium 116 exerts an upward force on a poppet 30 that is seated over an opening 84 at the bottom of a retainer 20, which is coupled to the lower end of the transmission member 16. At a desired level of pressure, the upward force on the poppet 30 overcomes the downward force on the poppet 30 that has been exerted by a second spring 82. The poppet 30 is unseated from the opening 84 of the retainer 20 which opens a plug 88 allowing the pressurized flowable medium 116 to flow into a clamping sleeve pressure chamber 24 located within the body 18, as seen in FIG. 10. The clamping sleeve pressure chamber 24 surrounds a thin-walled, hollow cylindrical clamping sleeve 14. As the pressurized flowable medium 116 fills the clamping sleeve pressure chamber 24, pressure builds on the outer surface of the clamping sleeve 14.

In step 1510, the clearance between the plunger 12 and the inner surface of the clamping sleeve 14 is removed. The plunger 12 is retained within the inner diameter of the clamping sleeve 14 with a very small clearance between the inner surface of the clamping sleeve 14 and the outer surface of the plunger 12. Pressure on the outer surface of the clamping sleeve 14 results in a contraction of the diameter of the clamping sleeve 14. Accordingly, the clamping sleeve 14 establishes contact with the plunger 12.

In step 1512, a clamping force is applied to the plunger 12 corresponding to the pressure applied to the clamping sleeve 14. The inner surface of the clamping sleeve 14 contacts the outer surface of the plunger 12. With a further increase in the pressure from the pressurized flowable medium 116, the clamping sleeve 14 applies a clamping force to the plunger 12 rigidly holding the plunger 12 in a fixed position to prevent axial or rotational movement of the plunger 12 from a variety of applied loads, as seen in FIG. 11.

Figure 16:
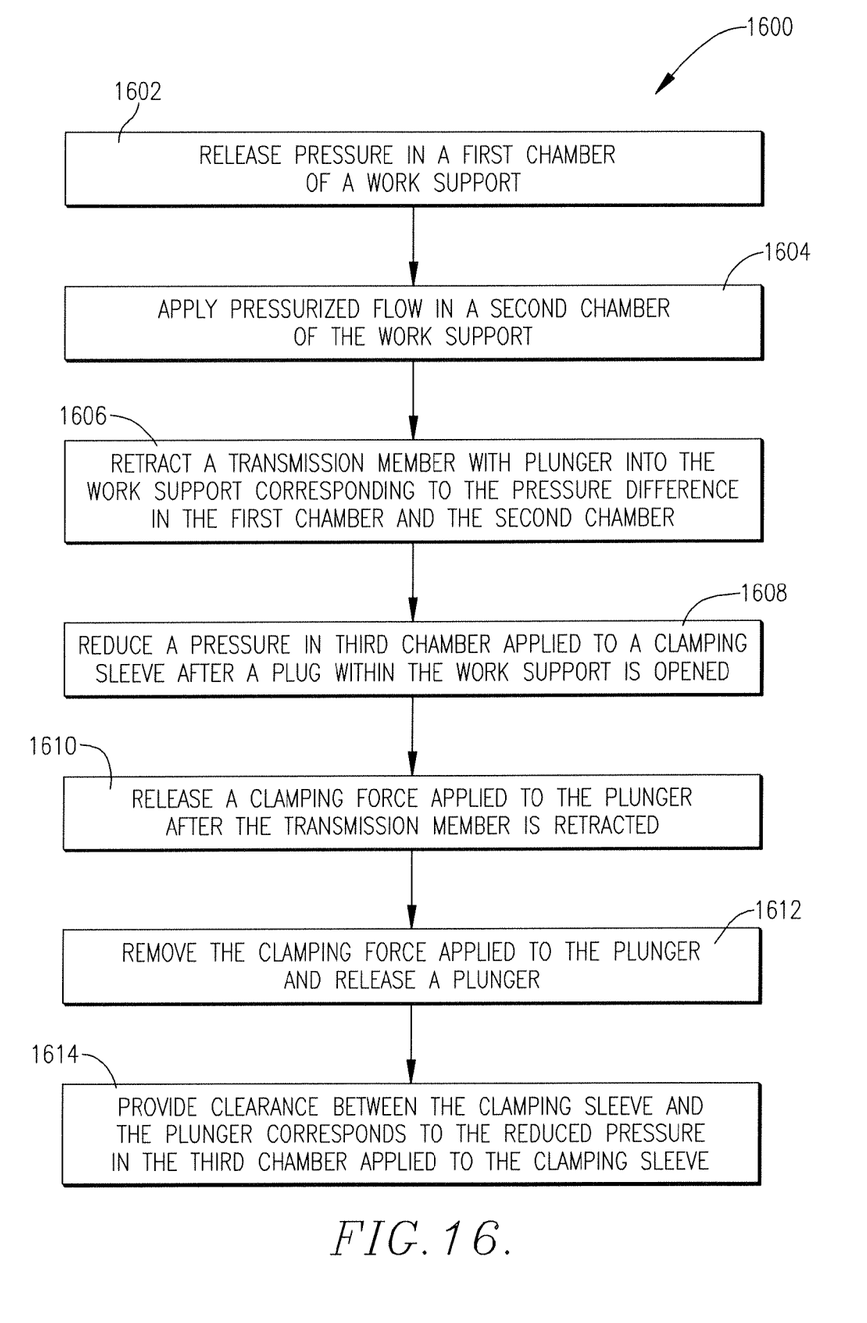
FIG. 16 is a flow diagram depicting some of the steps performed in a method of retracting and unclamping the work support.

An exemplary method 1600 of retracting and unclamping a work support 10 is illustrated in FIG. 16. The steps as shown in FIG. 16 do not imply a particular order of execution. Some steps may be performed before, concurrently with, or simultaneously with other steps in contrast to what is shown in the figure.

In step 1602, a pressure in a lower extend chamber 100 of the work support 10 is released. A first port 32 located in a body 18 of the work support 10 is opened to allow a pressurized flowable medium 116 to flow from the work support 10 to an external tank or reservoir. The flowable medium 116 flows from a lower extend chamber 100 located within the body 18 through a first port passageway 112 and out the first port 32. As the flowable medium 116 exits the lower extend chamber, pressure in the lower extend chamber 100 decreases.

In step 1604, a pressurized flow in an upper extend chamber 98 of the work support 10 is applied. A pressurized flowable medium 116 is supplied to a second port 34 located in the body 18 of the work support 10. From the second port 34, the flowable medium 116 flows through a second port passageway 114 and into an upper extend chamber 98, which is located at the opposite end of an extend chamber 26 from the lower extend chamber 100. As the pressurized flowable medium 116 fills the upper extend chamber 98, pressure in the upper extend chamber 98 increases to overcome the resistance of a transmission member 16 produced by the seal 102, the wiper 108, and the evacuation of the flowable medium 116 from the lower extend chamber 100.

In step 1606, the transmission member 16 with a plunger 12 is retracted into the work support 10 corresponding to the pressure difference in the upper extend chamber 100 and the lower extend chamber 98. Increasing pressure in the upper extend chamber 98 and decreasing pressure in the lower extend chamber 100 generally creates a downward force on the transmission member 16. The plunger 12 is held within the transmission member 16. The downward force pushes the transmission member 16 downward so that both the transmission member 16 and the plunger 12 retract into the work support, as seen in FIG. 12.

In step 1608, a pressure in a clamping sleeve pressure chamber 24 that is applied to a clamping sleeve 14 is reduced after a plug 88 within the work support 10 is opened. Increasing pressure in the upper extend chamber 98, along with reducing pressure in the lower extend chamber 100, continues to push the transmission member 16 and the plunger 12 downward within the body 18 of the work support 10. As the transmission member 16 and the plunger 12 lower to a certain position near the bottom of the lower extend chamber 100, a pusher 28 located at the lower boundary of the lower extend chamber 100 contacts a poppet 30 that is seated over an opening 84 at the bottom of a retainer 20, which is coupled to the lower end of the transmission member 16. A spring 82 exerts a downward force on a poppet 30 to keep the poppet 30 in place over the opening 84. As the pressure in the upper extend chamber 98 increases to a desired level, the downward force on the transmission member 16 is increased to overcome the force of the spring 82, such that the pusher 28 unseats the poppet 30 from the opening 84, which opens the plug 88. With the poppet 30 no longer blocking the opening 84 at the base of the retainer 20, a pressurized flowable medium 116, which was stored in a clamping sleeve pressure chamber 24, has a path to escape, as seen in FIG. 13. The clamping sleeve pressure chamber 24 surrounds a clamping sleeve 14, and the pressurized flowable medium 116, when present in the clamping sleeve pressure chamber 24, applies a pressure to the exterior of the clamping sleeve 14. The flowable medium 116 may exit the clamping sleeve pressure chamber 24 through a slot 60, a retainer flowable medium passageway 90, a cavity 78, the opening 84, a recess 96, and a slotted passageway 97 into the lower extend chamber 100, and flow out through the first port passageway 112 and the first port 32. As the pressurized flowable medium 116 leaves the clamping sleeve pressure chamber 24, the pressure applied to the clamping sleeve 14 decreases.

In step 1610, a clamping force that is applied to the plunger 12 is released after the transmission member 16 with the plunger 12 is retracted. After the poppet 30 is removed from the opening 84, the transmission member 16 with the plunger 12 continues to retract a minimal distance until the retainer 20 contacts the upper surface of a cap 22, at which point the transmission member 16 with the plunger 12 are fully retracted.

The clamping sleeve 14 is thin-walled, hollow, and cylindrical in shape. The plunger 12, with an outer diameter that is slightly smaller than the inner diameter of the clamping sleeve 14, is positioned within the inner diameter of the clamping sleeve 14. When the pressurized flowable medium 116 exits the clamping sleeve pressure chamber 24, the pressure applied to the exterior of the clamping sleeve 14 reduces and, in turn, the clamping force applied to the plunger 12 decreases.

In step 1612, the plunger 12 is released after the clamping force applied to the plunger 12 is removed. At a certain point of reduced pressure in the clamping sleeve pressure chamber 24, the clamping force on the plunger 12 is reduced to zero and the clamping sleeve 14 releases the plunger 12. The plunger 12 may extend upward, shown in FIG. 14, as a result of the force from a first spring 38 housed within the plunger 12 that was left in compression from the circumstances described above in step 1506. However, because the transmission member 16 is in the fully retracted position, the plunger 12 does not contact or disturb the work piece W.

In step 1614, clearance between the clamping sleeve 14 and the plunger 12 is provided and corresponds to the reduced pressure in the clamping sleeve pressure chamber 24 that is applied to the clamping sleeve 14. After the clamping sleeve 14 releases the plunger 12, falling pressure in the clamping sleeve pressure chamber 24 allows the diameter of the clamping sleeve 14 to expand. A gap, or clearance, between the inner diameter of the clamping sleeve 14 and the outer diameter of the plunger 12 forms and increases as the pressure in the clamping sleeve pressure chamber 24 continues to fall. As the pressure falls below a certain level, the clamping sleeve 14 fully relaxes and there is maximum clearance between the plunger 12 and the clamping sleeve 14.

Although the invention has been described with reference to the embodiments illustrated in the attached drawing figures, it is noted that equivalents may be employed and substitutions made herein without departing from the scope of the invention as recited in the claims.

Having thus describes various embodiments of the invention, what is claimed as new and desired to be protected by Letters Patent includes the following:

The invention claimed is:

1. A method of extending and clamping a work support, the method comprising the steps of:
   a) applying a pressurized flowable medium to the work support;
   b) extending a transmission member with a plunger from the work support corresponding to a change in at least a first pressure resulting from the pressurized flowable medium;
   c) allowing the pressurized flowable medium to flow from a first chamber to a third chamber when the transmission member is extended, wherein the pressurized flowable medium is allowed to flow from the first chamber to the third chamber by a plug which includes a poppet that is held in a first position by a first force from a resilient member under compression;
   d) applying a second pressure resulting from the pressurized flowable medium to a clamping mechanism after the transmission member is extended; and
   e) applying a clamping force to the plunger corresponding to the second pressure applied to the clamping mechanism.

2. The method of claim 1, further including the step of contacting a work piece with the plunger.

3. The method of claim 1, further including the step of removing the clearance between an inner surface of the clamping mechanism and the plunger.

4. The method of claim 1, wherein extending the transmission member from the work support includes filling a first chamber with the pressurized flowable medium.

5. The method of claim 4, wherein the first pressure is increased in the first chamber of the work support to assist in extending the transmission member with the plunger.

6. The method of claim 5, wherein a third pressure is released in a second chamber of the work support to assist in extending the transmission member with the plunger.

7. The method of claim 6, wherein applying the second pressure to the clamping mechanism includes filling a third chamber with the pressurized flowable medium that flows from the first chamber to the third chamber.

8. The method of claim 7, wherein the pressurized flowable medium does not flow from the first chamber to the third chamber until the pressure reaches a desired level.

9. The method of claim 7, wherein the pressurized flowable medium does not flow from the first chamber to the third chamber until a first force related to the pressure overcomes an opposing second force from a resilient member which prevents the flow of the pressurized flowable medium.

10. A method of extending and clamping a work support, the method comprising the steps of:
    a) applying a pressurized flowable medium to the work support;
    b) extending a transmission member with a plunger from the work support corresponding to the pressure difference in a first chamber and a second chamber resulting from the pressurized flow;
    c) allowing the pressurized flowable medium to flow from the first chamber to a third chamber when the transmission member is extended, wherein the pressurized flowable medium is allowed to flow from the first chamber to the third chamber by a plug which includes a poppet that is held in a first position by a first force from a resilient member under compression;
    d) contacting a work piece with the plunger;
    e) applying a first pressure resulting from the pressurized flowable medium to a clamping mechanism after the transmission member is extended;
    f) removing the clearance between an inner surface of the clamping mechanism and the plunger; and
    g) applying a clamping force to the plunger corresponding to the first pressure applied to the clamping mechanism.

11. The method of claim 10, wherein extending the transmission member from the work support includes filling the first chamber with the pressurized flowable medium.

12. The method of claim 11, wherein extending the transmission member from the work support includes releasing a second pressure for the second chamber by evacuating the pressurized flowable medium from the second chamber.

13. The method of claim 12, wherein applying the first pressure to the clamping mechanism includes filling a third chamber with the pressurized flowable medium that flows from the first chamber to the third chamber.

14. The method of claim 13, wherein the pressurized flowable medium does not flow from the first chamber to the third chamber until the first pressure reaches a desired level.

15. The method of claim 13, wherein the pressurized flowable medium does not flow from the first chamber to the third chamber until a first force related to the pressure overcomes an opposing second force from a resilient member which prevents the flow of the pressurized flowable medium.

16. A method of retracting and unclamping a work support, the method comprising the steps of:
   a) releasing a first pressure in a first chamber of the work support;
   b) applying a pressurized flowable medium to increase a second pressure in a second chamber of the work support;
   c) retracting a transmission member with a plunger into the work support corresponding to the pressure difference in the first chamber and the second chamber;
   d) reducing a third pressure in a third chamber that is applied to a clamping mechanism after a plug internal to the work support is opened, wherein the plug allows the pressurized flowable medium to flow from the first chamber to the third chamber when the transmission member is extended and includes a poppet that is held in a first position by a first force from a resilient member under compression;
   e) releasing a clamping force applied to the plunger after the transmission member is retracted; and
   f) providing clearance between the clamping mechanism and the plunger corresponding to the reduced third pressure.

17. The method of claim 16, wherein the first pressure is released by evacuating the pressurized flowable medium from the first chamber.

18. The method of claim 16, wherein the third pressure is reduced by evacuating the pressurized flowable medium from the third chamber.

19. A work support, the work support comprising:
   a plunger to receive a load from a work piece;
   a transmission member to extend and retract from the work support, wherein the plunger is retained within the interior of the transmission member;
   a first chamber for receiving a pressurized flowable medium, wherein the transmission member extends and retracts corresponding to pressure from the pressurized flowable medium within the first chamber;
   a third chamber for receiving the pressurized flowable medium from the first chamber;
   a clamping mechanism to apply a clamping force to the plunger when pressure from the pressurized flowable medium in the third chamber reaches a first level; and
   a plug that allows the pressurized flowable medium to flow from the first chamber to the third chamber when the transmission member is extended, the plug including a poppet that is held in a first position by a first force from a resilient member under compression.

20. The work support of claim 19, further including a pusher to open the plug when the transmission member is in a desired position.

21. The work support of claim 19, wherein the poppet is moved from the first position when a second force corresponding to the pressure in the first chamber overcomes the first force.

22. The work support of claim 19, wherein the third chamber surrounds at least a portion of the clamping mechanism.

23. The work support of claim 19, further including a second chamber for receiving the pressurized flowable medium from an external source to assist in retracting the transmission member.

24. A work support, the work support comprising:
   a plunger to receive a load from a work piece;
   a transmission member to extend and retract from the work support, wherein the plunger is retained within the interior of the transmission member;
   a first chamber for receiving a pressurized flowable medium from an external source, wherein the transmission member extends and retracts corresponding to pressure from the pressurized flowable medium within the first chamber;
   a second chamber for receiving a pressurized flowable medium from an external source to assist in retracting the transmission member;
   a third chamber for receiving the pressurized flowable medium from the first chamber;
   a clamping mechanism to apply a clamping force to the plunger when pressure from the pressurized flowable medium in the third chamber reaches a first level; and
   a plug that allows the pressurized flowable medium to flow from the first chamber to the third chamber when the transmission member is fully extended, the plug including a poppet that is held in a first position by a first force from a resilient member under compression.

25. The work support of claim 24, further including a pusher to open the plug when the transmission member is in a desired position.

26. The work support of claim 24, wherein the poppet is moved from the first position when a second force corresponding to the pressure in the first chamber overcomes the first force.

* * * * *